J. T. LISTER.
INNER TUBE.
APPLICATION FILED NOV. 24, 1905.
986,637.
Patented Mar. 14, 1911.
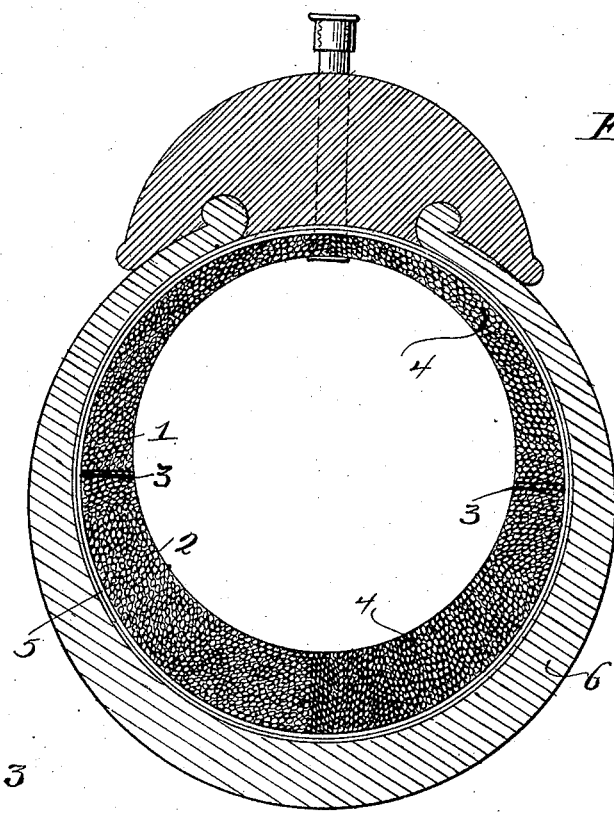
Fig. 1
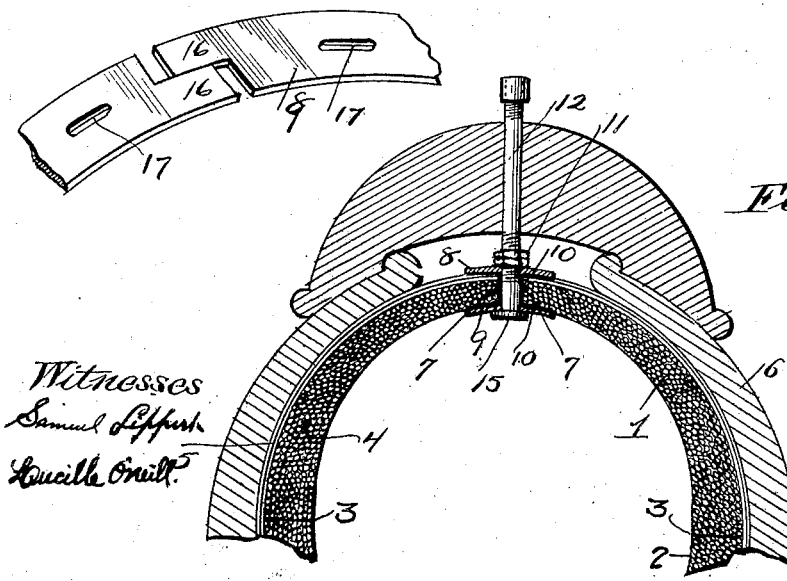
Fig. 3
Fig. 2
Witnesses
Samuel Lippert
Lucille O'neill
Inventor
John T. Lister
by
Wm. M. Monroe
Attorney

UNITED STATES PATENT OFFICE.

JOHN T. LISTER, OF CLEVELAND, OHIO.

INNER TUBE.

986,637. Specification of Letters Patent. Patented Mar. 14, 1911.

Application filed November 24, 1905. Serial No. 288,967.

*To all whom it may concern:*

Be it known that I, JOHN T. LISTER, a citizen of the United States, and resident of Cleveland, county of Cuyahoga, State of Ohio, have invented certain new and useful Improvements in Inner Tubes, of which I hereby declare the following to be a full, clear, and exact description, such as will enable others skilled in the art to which it appertains to make and use the same.

The objects of the invention are to provide an inner tube for a pneumatic tire which shall be practically puncture proof and shall fit closely to the inner surface of the outer case, and can not burst under ordinary conditions of use.

It is well known that the tire is the weakest part of an automobile construction, and adds not a little to the running expense, since the automobile tires as now constructed are liable to be punctured or to burst at any moment, and to leave the occupants of the car stranded many miles away from any shop or possible relief. To avoid these objections, I provide a durable and dependable device. I form the inner tube of flexible and puncture resisting material and also provide means for removing the inner tube, if by means of any accident it should need repairing. I accomplish these objects by means of the improved construction of the inner tube, and by means for securing the same to the outer tube, and for preventing the escape of air therefrom, as hereinafter described, shown in the accompanying drawings and specifically pointed out in the claims.

In the accompanying drawings, Figure 1 shows a tire in cross section, and shows a tubular form of inner tube, without openings except for the purpose of inflating the tube, Fig. 2 is a similar view, showing the inner tube parted on the center line at the inner side so that it can easily be removed for repair, and showing metal clamping bands to prevent the escape of air; Fig. 3 is a detail of a portion of one of the clamping rings shown in Fig. 2.

In these views the inner tire is composed of two semi-tubular bands 1 and 2 joined together at the edges, thus forming the tube. Each band is made separately by winding circumferentially upon a ring shaped form, a smooth finished, hard twisted cord 4, until the exact shape and size of one-half of the tube is obtained. These two halves are then joined together at their edges by strips of rubber 3 and rubber cement. The cord of which the bands are wound is also dipped in rubber cement which embeds the strands as in a matrix, and when the whole is cured, the cords and half portions are amalgamated together.

As soon as the half portions are attached together cord is wound radially around and around the tube forming an outer transverse coating as seen in the figures, at 5 as deep as may be required and by means of this outer coating the inner tube is brought to exactly the diameter of the inner surface of the outer case 6 so as to fit it closely when inserted therein. This cord also passes through cement as it is being wound and is cured at the same time with the other parts of the tube. It will be seen that the inner side of the tube is thinner than the outer side for the purpose both of giving greater flexibility with resiliency to the inner side, and greater resistance to puncturing to the outer or tread side.

In Fig. 2 means for making the inner tube removable are shown, for use in case of injury to the tube, so that it can readily be repaired on the inside, and so that the outer surface will remain smooth. Here the tube is shown to be split on the center line of the inner side at 7, and thin metal rings 8 and 9 cover the separated edges. Strips of rubber 10 cover these edges and the rings engage these strips. The metal rings are compressed tightly upon the rubber strips by means of nuts 11 upon bolts 12, and these bolts are preferably formed from the inflating tubes, by turning screw threads thereon, and fitting nuts upon them. A flange or head 15 at the inner end of each tube overlaps the inner ring and the rings are clamped between the nuts and flange. As many bolts of this character may be employed as may be necessary to insure perfectly air tight contact of the rings. The inner ring may be a complete circle, and the outer ring 8 is split as shown in Fig. 3 with overlapping ends 16, and slotted bolt holes 17 for adjustment.

I do not confine myself to the exact shape of parts shown or the material of which the rings are made. It is readily understood that the inner tube can readily be repaired if injured by cement patches, or it can be removed and another substituted for it.

Having described my invention what I claim as new and desire to secure by Letters Patent is:

1. An inner tube, comprising inner and outer halves, cemented together, each half being wound of hard twisted cord, circumferentially and the complete tube being wound transversely or radially of similar cord, substantially as described.

2. In combination in a pneumatic tire, an outer case and an inner tube contained in said case, said inner tube composed of cord wound in a rubber matrix, and cured, substantially as described.

3. An air tight inner tube comprising semi-tubular sections, each section composed of cord wound in a rubber matrix, and said sections being afterward secured together at their edges.

4. An inner tube for the purpose described, composed of cord first wound circumferentially and then transversely or radially, and having an opening extending around the inner side, and means for closing said opening, substantially as described.

In testimony whereof I hereunto set my hand.

JOHN T. LISTER.

Witnesses:
WM. M. MONROE,
SAMUEL LIPPERT.

Copies of this patent may be obtained for five cents each, by addressing the "Commissioner of Patents, Washington, D. C."